(12) United States Patent
Tsuchihashi et al.

(10) Patent No.: US 6,969,999 B2
(45) Date of Patent: Nov. 29, 2005

(54) MOVING OBJECT DETECTION APPARATUS (75) Inventors: Choichiro Tsuchihashi, Kobe (JP); Yoshihiro Sasaki, Kobe (JP); Hideki Shiratori, Sapporo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 10/627,581

(22) Filed: Jul. 24, 2003

(65) Prior Publication Data

US 2004/0061509 A1     Apr. 1, 2004

(30) Foreign Application Priority Data

Jul. 29, 2002    (JP)    .............................. 2002-220287

(51) Int. Cl.[7] .......................... G01R 27/04; G01S 13/00
(52) U.S. Cl. .......................... 324/633; 324/609; 342/28
(58) Field of Search ................ 324/609, 633, 324/637, 642; 331/96, 117 D; 330/302; 342/28, 342/203, 204, 165, 173, 174

(56) References Cited

U.S. PATENT DOCUMENTS

| | | | |
|---|---|---|---|
| 5,130,675 A | * | 7/1992 | Sugawara ................ 331/117 D |
| 5,237,330 A | * | 8/1993 | Yaacov et al. ................. 342/28 |
| 5,450,040 A | * | 9/1995 | Matsui et al. .................. 331/96 |
| 5,576,713 A | * | 11/1996 | Suzuki et al. ................ 342/174 |
| 5,805,023 A | * | 9/1998 | Fukuden ...................... 330/302 |

FOREIGN PATENT DOCUMENTS

JP     2000-31703    1/2000

OTHER PUBLICATIONS

A 10.5 GHz MIC Direction Sensitive Doppler Module Using GaAs FET and Sg/Pd Thick Film. 1981 IEEE, pp. 319-321.*
A 10.5 GHz MIC Direction Sensitive Doppler Module Using GaAs FET and Sg/Pd Thick Film. 1981 IEEE, pp. 319-321.*
Patent Abstract of Japan, Publication No. 2000031703 A, Published on Jan. 28, 2000, in the name of Hiratsuka Toshiro, et al.

* cited by examiner

Primary Examiner—Vincent Q. Nguyen
(74) Attorney, Agent, or Firm—Christie, Parker and Hale, LLP

(57) ABSTRACT

A moving object detection apparatus in which an oscillating output, from a gate of an FET functioning as an oscillator, is coupled via a resonant line to a transmit-receive antenna, a wave, transmitted from the antenna and returned as a reflected wave, is received at the gate, and a beat signal component output from the gate, due to a phase difference between the transmitted wave and the reflected wave, is taken as a moving object detection signal.

4 Claims, 7 Drawing Sheets

Fig.1

PRIOR ART

Fig.2

PRIOR ART

Fig.3 PRIOR ART

Fig.4C (Sad) (a) (d)

WHEN PHASES ARE OPPOSITE EACH OTHER ($\theta = 180°$) AMPLITUDE OF SUPERIMPOSED WAVE BECOMES SMALL

PRIOR ART

Fig.4B (Sac) (a) (c)

OUT OF PHASE ($\theta = 90°$)

PRIOR ART

Fig.4A (Sab) (a) (b)

IN PHASE ($\theta = 0°$)

PRIOR ART

Fig.5

PRIOR ART

Fig.6

PRIOR ART

Fig.7

PRIOR ART

Fig.8

PRIOR ART

MOVING OBJECT DETECTION APPARATUS

CROSS REFERENCE TO RELATED APPLICATION

This application claims priority of Japanese patent application No. 2002-220287, filed Jul. 29, 2002.

BACKGROUND OF THE INVENTION

1. Field of the Invention

The present invention relates to a moving object detection apparatus for detecting a moving object and, more particularly, for detecting whether an object, such as a human being, a vehicle, an obstruction, a fixed object, or the like (hereinafter collectively referred to as an "object"), is moving or not.

2. Description of the Related Art

Figure 1:
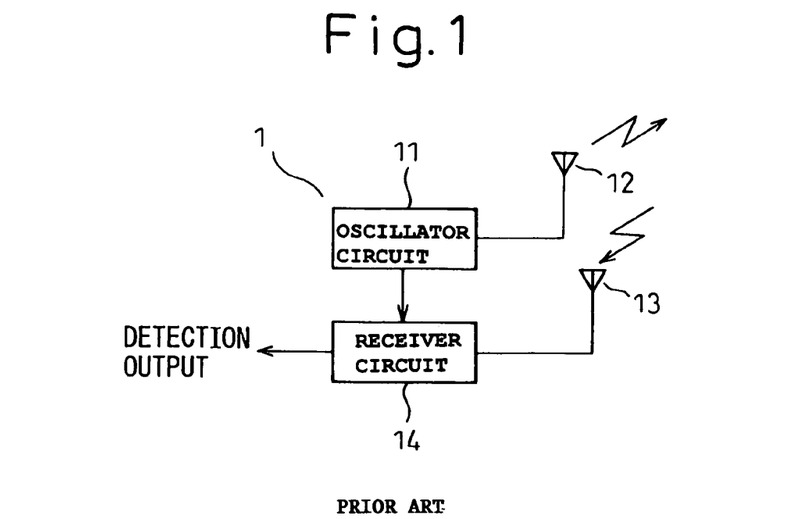
FIG. 1 is a block diagram of a moving object detection apparatus.

FIG. 1 shows a block diagram of a moving object detection apparatus 1. An output of an oscillator circuit 11 is radiated from a transmitting antenna 12 toward an object, and the wave reflected by the object is received by a receiving antenna 13; the received wave is then mixed in a receiver circuit 14 with a portion of the transmitted wave to produce a beat signal. This beat signal, as a detection output, is passed on to a detector circuit which outputs a moving object detection signal.

Figure 2:
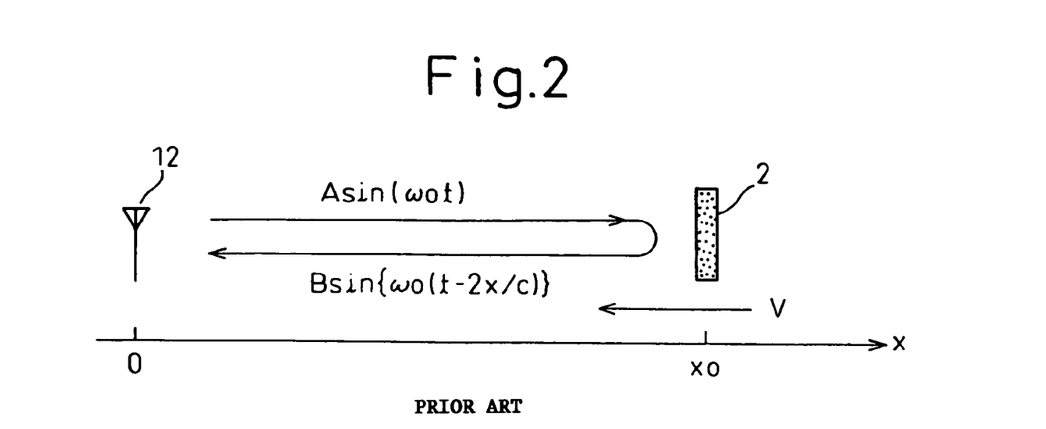
FIG. 2 is a diagram illustrating the principle of a method for detecting a moving object using the moving object detection apparatus.

If the object is moving, the reflected wave is shifted in frequency due to the Doppler effect. When the transmitted frequency is $f_0$, for example, the reflected frequency is $f_0+\Delta$. Here, the amount of shift, $\Delta$, is derived from the following equation.

$$\Delta = \text{Reflected frequency} - \text{Transmitted frequency} = \frac{(2v/c)}{f_0} \quad (1)$$

v: Relative velocity of moving object with respect to detection apparatus
c: Velocity of light FIG. 2 is a diagram illustrating the principle of a method for detecting a moving object using the above moving object detection apparatus. In FIG. 2, $x_0$ indicates the position of the moving object 2 at t=0; when the transmitted wave $A\sin(\omega_0 t)$ radiated from the transmitting antenna 12 is reflected by the moving object 2 approaching at a velocity v, the reflected wave is given as $B\sin\{\omega_0(t-2x/c)\}$. Here, x is the position of the moving object 2, and c is the velocity of light. If $x=x_0-vt$, then, the reflected wave is given as $$B\sin[\omega_0\{t-2(x_0/c-vt/c)\}]$$

$$B\sin[\omega_0(1+2v/c)t-\omega_0(2x_0/c)] \quad (2)$$

Figure 3:
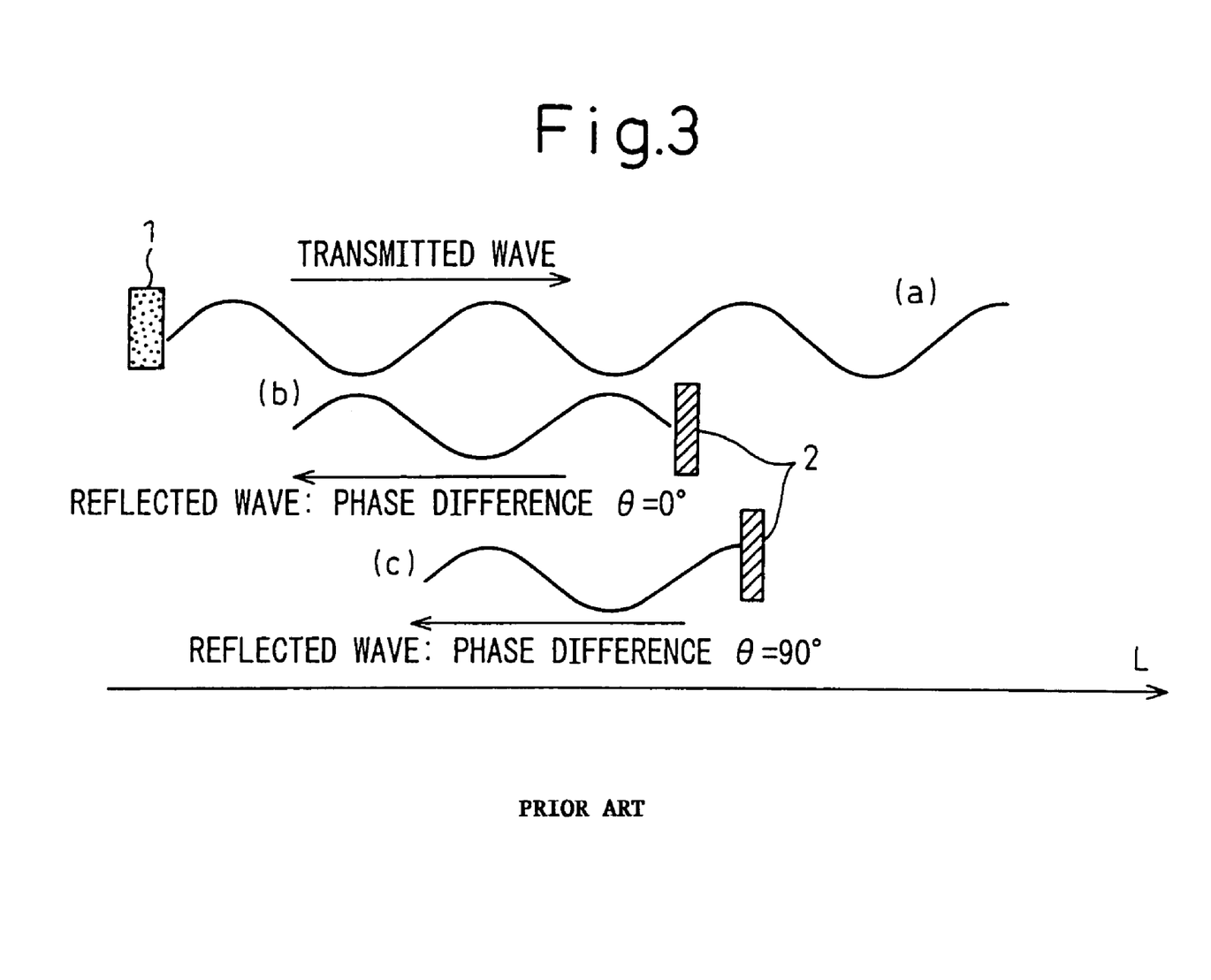
FIG. 3 is a diagram showing the phase relationship between a wave transmitted from the moving object detection apparatus and a wave reflected from an object.

FIG. 3 is a diagram showing the phase relationship between the wave transmitted from the moving object detection apparatus 1 and the wave reflected from the object 2. As shown in FIG. 3, when the object is stationary, the phase difference between the transmitted wave and the reflected wave is a function of the distance L between the object and the moving object detection apparatus 1. In FIG. 3, (a) shows the waveform of the transmitted wave, (b) the waveform of the reflected wave with a phase difference of 0, and (c) the waveform of the reflected wave with a phase difference of 90°. The phase difference between the transmitted wave and the received wave depends on the distance between the moving object detection apparatus 1 and the object 2.

Figure 4A:
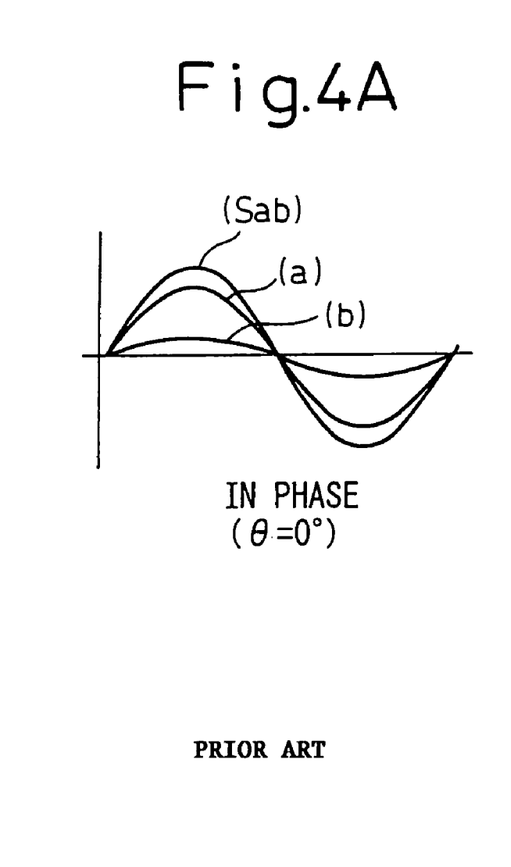
FIGS. 4A to 4C are diagrams each showing the relationship between the transmitted wave and the reflected wave and their superimposed wave.
Figure 4B:
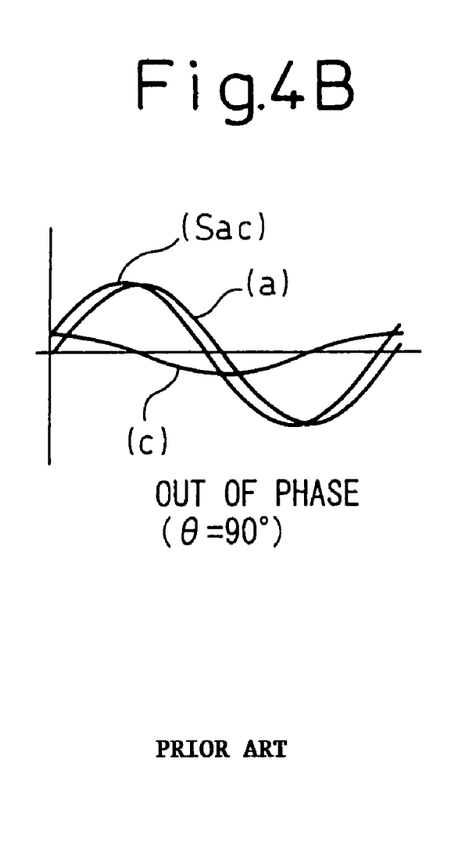
Figure 4C:
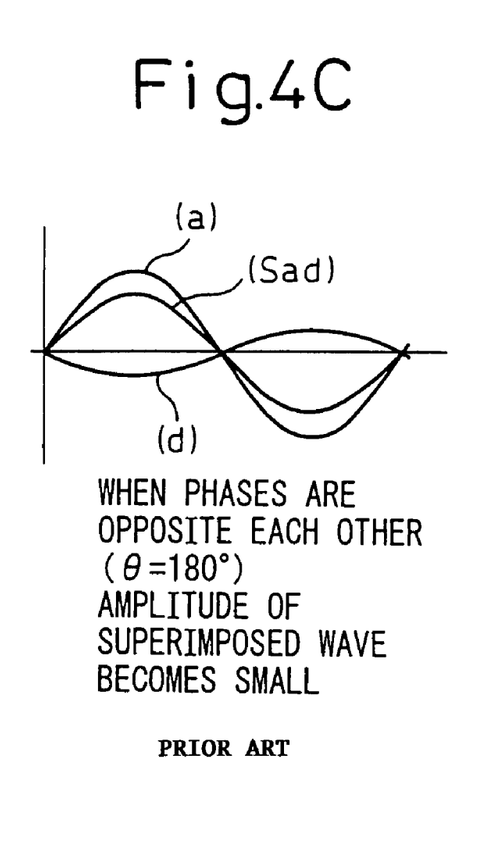

FIGS. 4A to 4C are diagrams each showing the relationship between the transmitted wave (a) and the reflected wave (b) and their superimposed wave. FIG. 4A shows the superimposed wave (Sab) when the phase difference $\theta$ of the reflected wave is 0. FIG. 4B shows the superimposed wave (Sac) when the phase difference $\theta$ of the reflected wave (c) is 90°. FIG. 4C shows the superimposed wave (Sad) when the phase difference $\theta$ of the reflected wave (d) is 180°.

Figure 5:
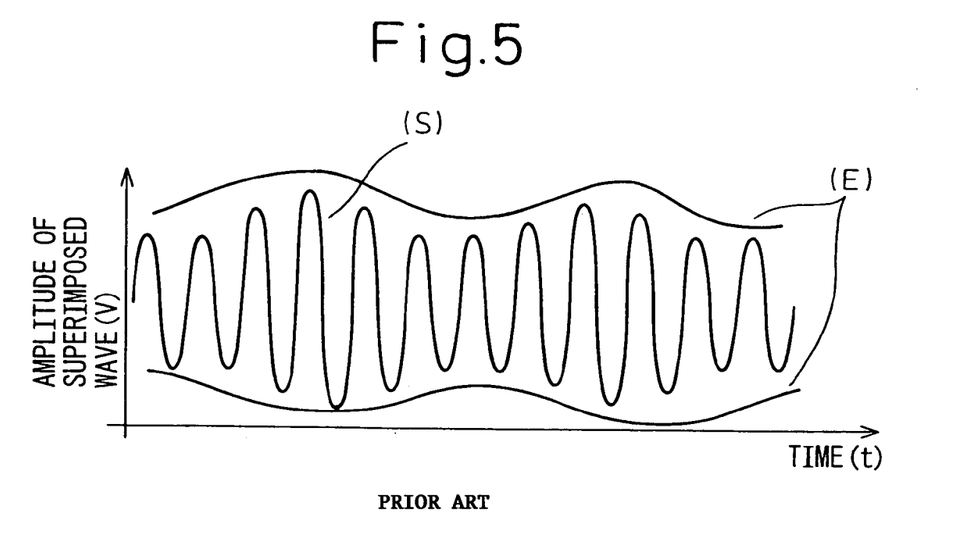
FIG. 5 is a diagram showing the envelope of the superimposed wave.

As can be seen from FIGS. 4A to 4C, the waveform of the superimposed wave produced by combining the transmitted wave with the received wave varies with the distance between the object and the detection apparatus, provided that the size of the object and the material of its surface remain the same. Therefore, when the object is moving, the superimposed wave (S) varies as shown in FIG. 5. When the amount of change of the envelope (E) of the superimposed wave (S) is extracted, a signal proportional to the relative velocity of the object can be obtained, thus making it possible to detect whether the object is moving or not.

Figure 6:
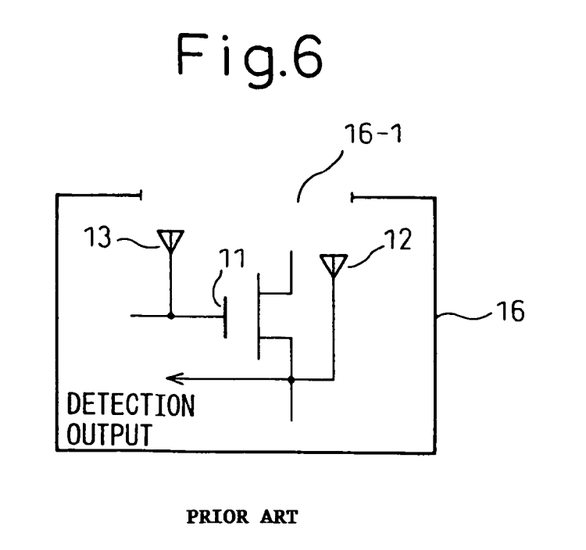
FIG. 6 is a diagram showing a one-element type moving object detection apparatus according to the prior art.

FIG. 6 is a diagram showing a one-element type moving object detection apparatus according to the prior art. As shown in FIG. 6, an oscillator 11, a transmitting antenna 12, a receiving antenna 13, etc. are placed within a cavity resonator 16, and a moving object detection signal is obtained by transmitting and receiving waves through an opening 16-1 formed in a portion of the cavity resonator 16.

Figure 7:
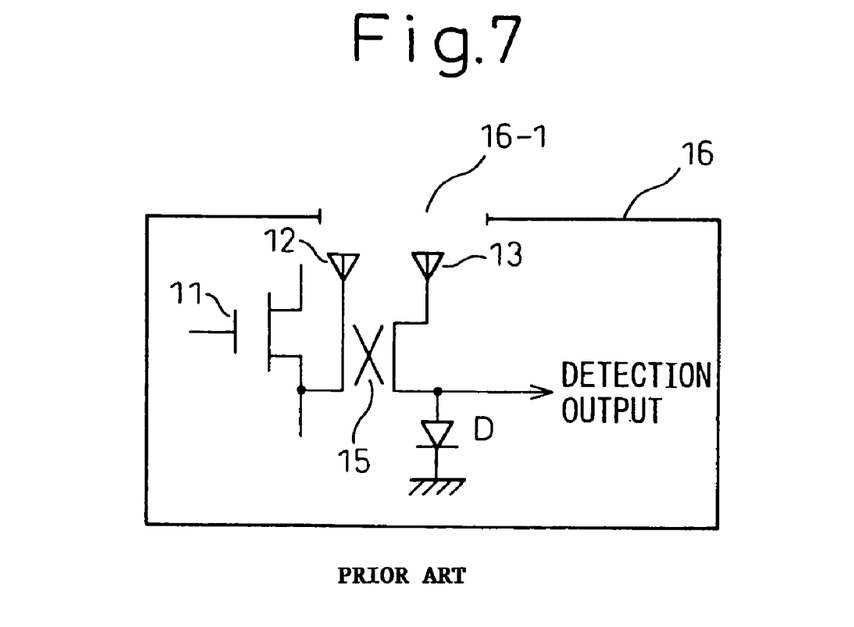
FIG. 7 is a diagram showing a two-element type moving object detection apparatus according to the prior art.

FIG. 7 is a diagram showing a two-element type moving object detection apparatus according to the prior art. As shown in FIG. 7, an oscillator 11, a transmitting antenna 12, a receiving antenna 13, a coupler 15, a diode D as a detector, etc. are placed within a cavity resonator 16, and a moving object detection signal is obtained by transmitting and receiving waves through an opening 16-1 formed in a portion of the cavity resonator 16.

An FET such as a GaAs FET or a heterojunction FET (HEMT) is used as the oscillator.

As shown, each of the prior art moving object detection apparatuses is provided with two separate antennas, the transmitting antenna 12 and the receiving antenna 13, and a beat component is extracted as the detection output from the drain or source of the FET functioning as the oscillator. All the circuit components are mounted on a board, and the entire structure is housed in the cavity resonator 16, with the antennas located near the opening formed in a portion of the cavity resonator; if needed, an external antenna can be connected.

Figure 8:
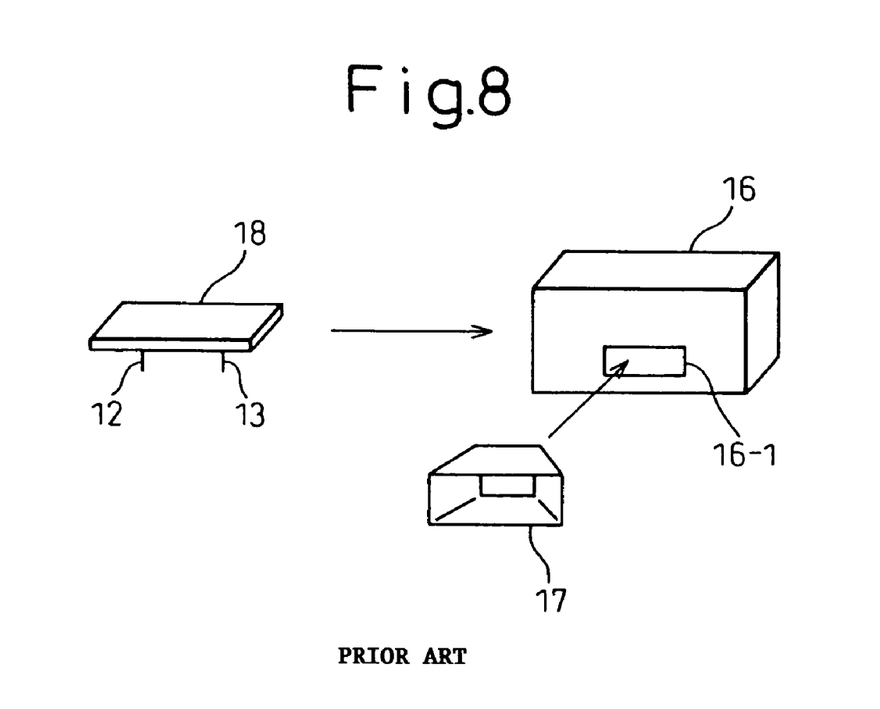
FIG. 8 is a diagram schematically showing the arrangement of the moving object detection apparatus.

FIG. 8 is a diagram schematically showing the arrangement of the cavity resonator 16, the circuit board 18 with the circuit components such as the transmitting antenna 12 and the receiving antenna 13 mounted thereon, and the external antenna 17. The circuit board 18 is housed in the cavity resonator 16 for enhanced antenna efficiency, etc., and the opening 16-1 is formed in the cavity resonator 16 so that the antennas 12 and 13 can transmit and receive waves to and from the outside. The external antenna 17, if needed, is mounted in the opening 16-1 formed in the cavity resonator 16.

Of the above prior art moving object detection apparatuses, the one-element type shown in FIG. 6 is simple in circuitry, but has the problem that satisfactory reception sensitivity cannot be obtained if the amplification gain of the FET is not large enough.

On the other hand, the two-element type shown in FIG. 7 has the problem that the cost increases because of the increased circuit complexity and the increased number of elements.

In both the one-element type and the two-element type, as all the circuit components are housed in the cavity resonator, an antenna has to be connected to the opening when changing the moving object detection area, and, hence, there is the problem that not only the cost but also the size of the detector increases.

Accordingly, it is an object of the present invention to provide a moving object detection apparatus that is simple in configuration and that achieves reductions in size and cost.

SUMMARY OF THE INVENTION

According to the moving object detection apparatus of the present invention, an oscillating output, from a gate of an FET functioning as an oscillator, is coupled via a resonant line to a transmit-receive antenna, a wave transmitted from the antenna and returned as a reflected wave is received at the gate, and a beat signal component, output from the gate due to a phase difference between the transmitted wave and the reflected wave, is taken as a moving object detection signal.

The FET and the resonant line are formed on a multilayer board and housed in a cavity resonator, and the antenna is provided on an underside of the multilayer board and slot-coupled to the resonant line by a triplate structure.

A GaAs FET or a heterojunction FET is used as the FET.

According to the present invention, as the moving object detection apparatus is constructed using one oscillator and one transmit-receive antenna, the circuit configuration can be simplified and, hence, the size and the cost can be reduced. Furthermore, as the antenna can be provided outside the cavity resonator, the freedom of antenna design increases. As a result, even when the moving object detection area is changed, there is no need to connect an antenna to the opening as in the prior art.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 9:
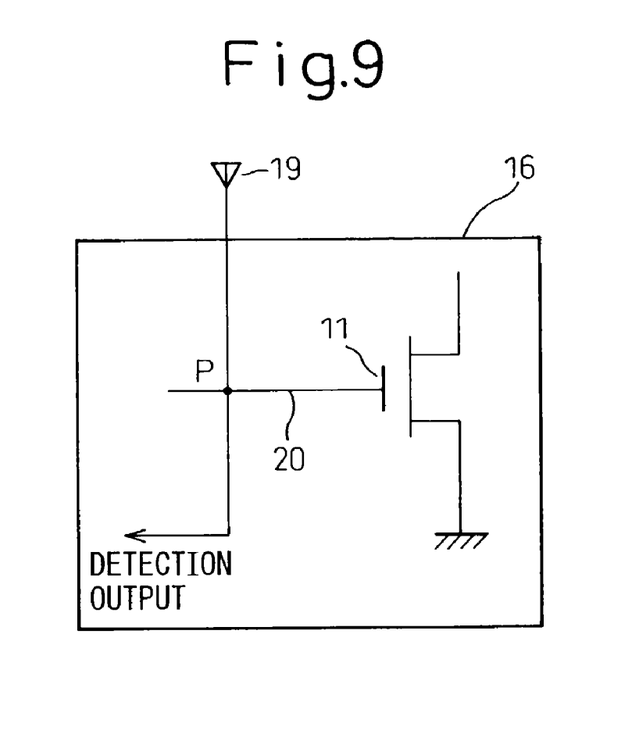
FIG. 9 is a diagram showing an essential portion of a moving object detection apparatus according to the present invention.

FIG. 9 is a diagram showing an essential portion of a moving object detection apparatus according to the present invention. A FET 11 such as a GaAs FET or a heterojunction FET (HEMT) is used as an oscillator within a cavity resonator 16, and the gate of the FET 11 is connected via a resonant line 20 to a transmit-receive antenna 19 provided outside the cavity resonator 16. Either the source or drain electrode of the FET is connected to a power supply, and the other electrode is grounded. The output from the FET 11 is coupled via the resonant line 20 to the transmit-receive antenna 19 and transmitted out; the reflected wave is received by the same transmit-receive antenna 19, and a moving object detection signal, i.e., the detection output, is taken from a node P connecting between the antenna 19 and the FET 11.

Usually, the gate of an FET is isolated from external circuitry, because the gate is sensitive. In contrast, the present invention utilizes this property and achieves a configuration that can detect a moving object with simple circuitry. That is, the oscillating output from the gate of the FET 11 functioning as the oscillator is coupled via the resonant line 20 to the transmit-receive antenna 19 provided outside the cavity resonator 16, and the reflected wave is received and coupled to the same gate; when the reflected wave from the outside is applied to the FET 11, a beat signal component equal to the phase difference is produced, and this component is output on the resonant line 20 and taken as the detection output, i.e., the moving object detection signal.

This configuration permits the single transmit-receive antenna to be provided outside the cavity resonator 16, and serves to reduce the number of circuit elements, achieving a reduction in overall size. Furthermore, when the detection area is changed, it is only necessary to change the shape of the external antenna, and there is no need to provide a separate external antenna.

Figure 10:
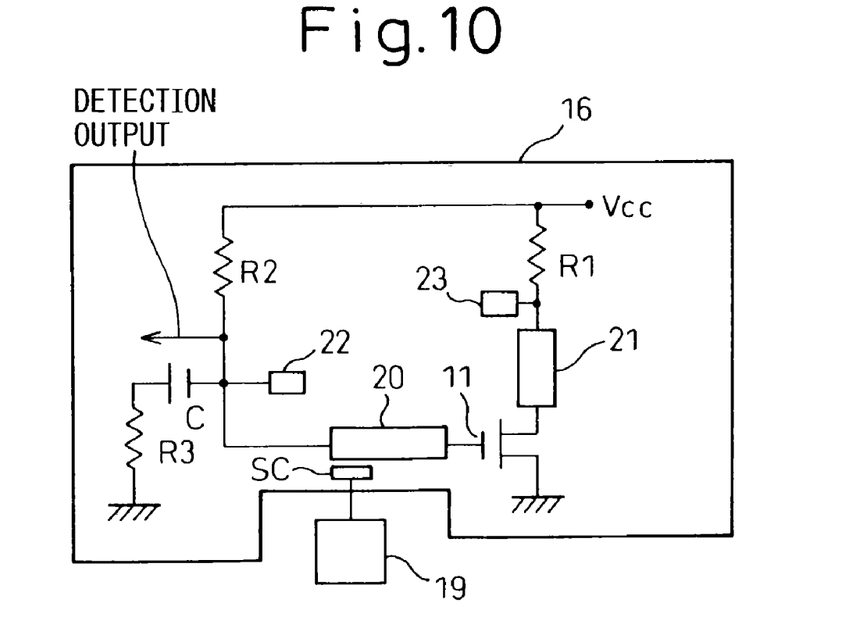
FIG. 10 is a diagram showing a specific configuration example of the moving object detection apparatus of the present invention.

FIG. 10 is a diagram showing a specific configuration example of the moving object detection apparatus of the present invention. In the figure, the gate of the oscillator FET 11 is connected to the resonant line 20 which, in turn, is slot-coupled (SC) to the transmit-receive antenna 19 provided outside the cavity resonator 16. A HEMT or a GaAs FET, for example, is used as the FET 11. Either the drain or source electrode of the FET 11 is grounded, and the other electrode is connected to a power supply Vcc via a matching stub 21 and a resistor R1. Indicated at 23 is a high-frequency eliminating stub. The resonant line 20 is grounded via a capacitor C and a resistor R3, and is connected to the power supply via a resistor R2; the detection output is taken from a node connecting between the resistor R2 and the capacitor C. Indicated at 22 is a high-frequency eliminating stub. These circuit components, other than the antenna 19, are placed inside the cavity resonator 16.

Figure 11:
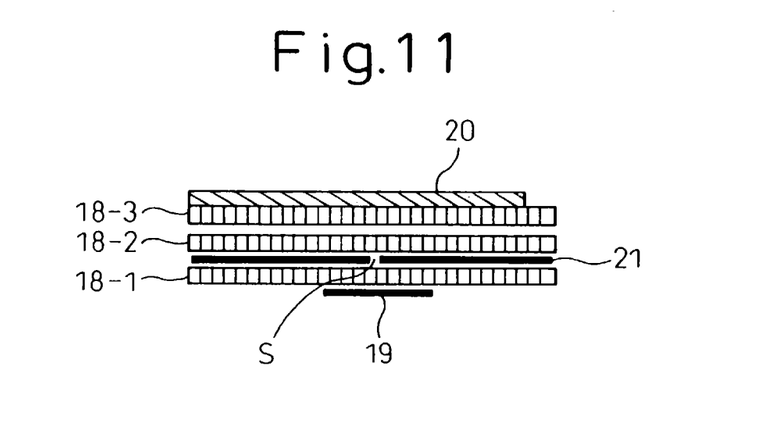
FIG. 11 is a diagram showing a triplate structure.

FIG. 11 is a diagram showing an example of a triplate structure for slot-coupling the resonant line 20 and the transmit-receive antenna 19. The antenna 19 is provided outside the cavity resonator 16 and slot-coupled by the triplate structure. In FIG. 11, reference numeral 19 is the antenna, 18-1, 18-2, and 18-3 are dielectric core members forming a circuit board 18, 21 is a ground conducting member with a slot S formed therein, and 20 is the resonant line. As the antenna 19 is slot-coupled to the resonant line 20 by the triplate structure as described above, the antenna 19 can be placed outside the cavity resonator 16. AS shown in FIG. 11, the resonant line 20 is provided on the circuit board 18, and placed within the cavity resonator 16. On the other hand, the antenna 19 is provided on the underside of the circuit board 18, and placed outside the cavity resonator 16.

In the above detection circuit, the gate transmission line is increased using a conventional dielectric oscillator circuit, and the slot S is formed within the layered structure at a position separated from an open end by one quarter of the wavelength $\lambda$ ($\lambda/4$) of the frequency used. This position varies depending on the dielectric constant of the circuit board. An antenna 19 such as a patch antenna is provided on the underside of the circuit board by aligning its position with the center of the slot S. This provides freedom in antenna design.

Figure 12:
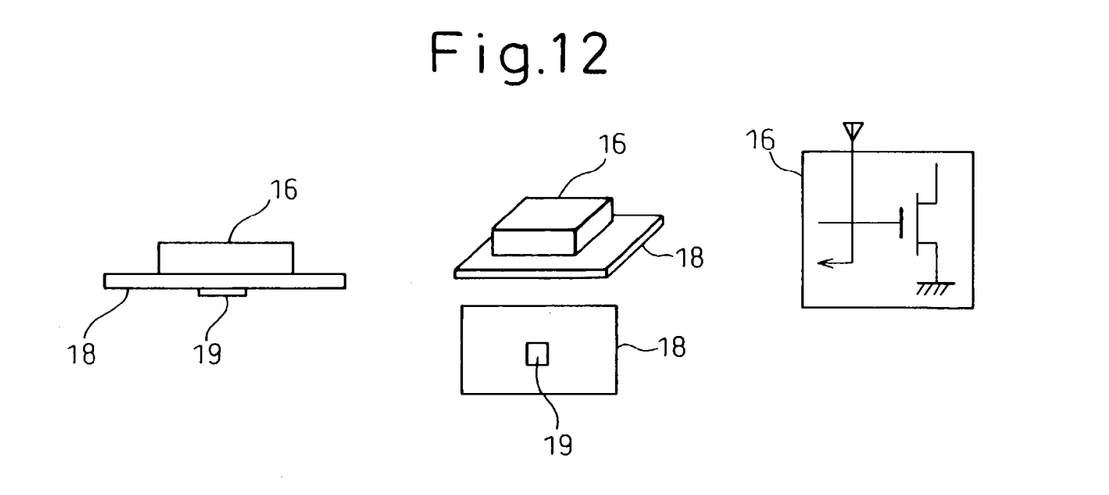
FIG. 12 is a diagram showing an external view of the moving object detection apparatus of the present invention.

FIG. 12 is a diagram showing an external view of the cavity resonator 16 assembled together with the patch antenna 19 and circuit board 18 of the triplate structure shown in FIG. 11. As shown in FIG. 12, the patch antenna is provided on the underside of the circuit board 18, and the upper side of the circuit board is covered with the cavity resonator 16.

What is claimed is:

1. A moving object detection apparatus in which an oscillating output, from a gate of an FET functioning as an oscillator, is coupled via a resonant line to a transmit-receive antenna, a wave, transmitted from said antenna and returned as a reflected wave, is received at said gate, and a beat signal component output from said gate due to a phase difference between said transmitted wave and said reflected wave is taken as a moving object detection signal.

2. A moving object detection apparatus as claimed in claim 1, wherein said FET and said resonant line are formed on a multilayer board and housed in a cavity resonator, and said antenna is provided on an underside of said multilayer board and slot-coupled to said resonant line by a triplate structure.

3. A moving object detection apparatus as claimed in claim 2, wherein said FET is a GaAs FET or a heterojunction FET.

4. A moving object detection apparatus as claimed in claim 1, wherein said FET is a GaAs FET or a heterojunction FET.

* * * * *